US008340387B2

(12) United States Patent
Zhang et al.

(10) Patent No.: US 8,340,387 B2
(45) Date of Patent: Dec. 25, 2012

(54) FAST PREPROCESSING ALGORITHMS FOR DIGITAL MAMMOGRAPHY CAD AND WORKSTATION

(75) Inventors: Heidi Daoxian Zhang, Los Gatos, CA (US); Patrick Bernard Heffernan, Los Gatos, CA (US)

(73) Assignee: Three Palm Software, Los Gatos, CA (US)

( * ) Notice: Subject to any disclaimer, the term of this patent is extended or adjusted under 35 U.S.C. 154(b) by 1081 days.

(21) Appl. No.: 12/053,609

(22) Filed: Mar. 23, 2008

(65) Prior Publication Data
US 2009/0220138 A1 Sep. 3, 2009

Related U.S. Application Data

(60) Provisional application No. 60/923,188, filed on Apr. 13, 2007.

(51) Int. Cl.
*G06K 9/00* (2006.01)
*A61B 6/04* (2006.01)
(52) U.S. Cl. ............... 382/132; 382/131; 378/4; 378/37
(58) Field of Classification Search .................. 382/128, 382/131, 132; 378/4, 37
See application file for complete search history.

(56) References Cited

U.S. PATENT DOCUMENTS

| | | | | |
|---|---|---|---|---|
| 5,365,600 A | * | 11/1994 | Nagaishi | 382/281 |
| 5,427,100 A | * | 6/1995 | Higashi et al. | 600/410 |
| 5,572,565 A | | 11/1996 | Abdel-Mottaleb | |
| 5,610,966 A | * | 3/1997 | Martell et al. | 378/58 |
| 5,657,362 A | * | 8/1997 | Giger et al. | 378/37 |
| 5,825,910 A | * | 10/1998 | Vafai | 382/132 |
| 6,021,222 A | * | 2/2000 | Yamagata | 382/199 |
| 6,035,056 A | * | 3/2000 | Karssemeijer | 382/132 |
| 6,091,841 A | * | 7/2000 | Rogers et al. | 382/132 |
| 6,356,651 B2 | * | 3/2002 | Murakami | 382/128 |
| 8,103,077 B2 | * | 1/2012 | Hong et al. | 382/132 |
| 2002/0181797 A1 | * | 12/2002 | Young | 382/260 |
| 2005/0163360 A1 | * | 7/2005 | Snoeren et al. | 382/132 |
| 2006/0098865 A1 | * | 5/2006 | Yang et al. | 382/159 |
| 2006/0147101 A1 | * | 7/2006 | Zhang et al. | 382/131 |
| 2007/0255480 A1 | * | 11/2007 | Southall et al. | 701/96 |
| 2008/0069416 A1 | * | 3/2008 | Luo | 382/128 |

OTHER PUBLICATIONS

Hamza et al., Automatic Scoring of the Collimation Quality Control (QC) Phantom Using Image Processing Technique, J. Sc. Tech, vol. 10 (2), 2009, pp. 159-174.*
Kiryati et al., A Probabilistic Hough Transform, Pattern Recognition, vol. 24, No. 4, 1991, pp. 303-316.*
Duda et al., Use of the Hough Transform to Detect Lines and Curves in Pictures, Technical Note 36, Artificial Intelligence Center, Comm. ACM, vol. 15, No. 1, 1972, pp. 11-15.*
Song et al., A Hough Transofrm Based Line Recongnition Method Utilizing Both Parameter Space and Image Space, The Journal of the Pattern Recognition, 2005, pp. 539-552.*

* cited by examiner

*Primary Examiner* — Alexander H Taningco
(74) *Attorney, Agent, or Firm* — Haynes and Boone, LLP

(57) ABSTRACT

A method and apparatus are disclosed for an image preprocessing device that automatically detects chestwall laterality; removes border artifacts; and segments breast tissue and pectoral muscle from digital mammograms. The algorithms in the preprocessing device utilize the computer cache, a vertical Sobel filter and a probabilistic Hough transform to detect curved edges. The preprocessing result, along with a pseudo-modality normalized image, can be used as input to a CAD (computer-aided detection) server or to a mammography image review workstation. In the case of workstation input, the preprocessing results improve the protocol for chestwall-to-chestwall image hanging, and support optimal image contrast display of each segmented region.

12 Claims, 6 Drawing Sheets

FAST PREPROCESSING ALGORITHMS FOR DIGITAL MAMMOGRAPHY CAD AND WORKSTATION

This application claims priority to U.S. Provisional Application No. 60/923,188, filed on Apr. 13, 2007.

BACKGROUND OF THE INVENTION

The present invention relates generally to the field of medical imaging systems. Particularly, the present invention relates to methods for preprocessing digital mammography images in conjunction with a mammography computer-aided detection (CAD) server and a digital mammography workstation.

Digital mammogram preprocessing includes chestwall laterality detection, border artifact clipping, breast tissue segmentation, pectoral muscle segmentation, and image normalization. The results of the preprocessing are usually used by a CAD server to detect abnormalities within the breast segmented areas of normalized mammogram images. The results of the preprocessing are also used as inputs for a mammography workstation, where the bright borders present on an unprocessed image need to be clipped using the correctly identified laterality for a standard image hanging protocol. The separate segmentations of each region in the breast also improve the image contrast optimization or the intensity inversion on the mammography workstation.

The existing methods for breast segmentation are usually based on one of two methods. In the first method, the segmentation is based on a number of nearest neighbor pixels within a region that is grown from a seed point. In the second method, a gradient threshold is used to determine the inside or outside of a segmentation region. Processing using these types of algorithms is computationally slow. A region growing method or gradient method also only will detect one connected region, so the methods can not handle a mammography cleavage view, which includes the medial portions of both right and left breasts.

A typical algorithm for pectoral muscle segmentation is based on a single-line Hough transform to model the edge as a straight line between the breast tissue and the pectoral muscle. So the segmentation result cannot accurately represent the curved shape of the pectoral muscle. Alternatively, a generalized Hough transform can be used to model a curved shape; however its calculation is more expansive than the single line approach, resulting in slower processing time.

SUMMARY

This invention solves existing problems in image preprocessing for mammography CAD and mammography workstation display by utilizing faster and more accurate segmentation algorithms that automatically detects chestwall laterality; removes border artifacts; and segments breast tissue and pectoral muscle from digital mammograms.

The algorithms in the preprocessing device utilize the computer cache and a vertical Sobel filter to segment breast tissue; and a probabilistic Hough transform to detect curved edges. The preprocessing result, along with a pseudo-modality normalized image, can be used as input to a CAD (computer-aided detection) server or to a mammography image review workstation. In the case of workstation input, the preprocessing results improve the hanging protocol for chestwall-to-chestwall image alignment, and support optimal image contrast display of each segmented region.

According to some embodiments, a method for detecting the laterality of a mammogram image is provided. The method includes receiving a mammogram image, downsampling the image, and performing a normalization process on the image. The method further includes applying a probabilistic Hough transform to the image to generate a number of right PHT lines in the right half of the image and to generate a number of left PHT lines in the left half of the image and then comparing the number of right PHT lines with the number of left PHT lines to determine a laterality of the mammogram image.

A method for detecting and determining the positions of borders in a mammogram image is also provided consistent with some embodiments. The method may comprise receiving an image; duplicating a left portion, a right portion, a top portion, and a bottom portion of the image, each portion defined as a percentage of the mammogram image; and applying a Sobel filter with a first kernel to the right and left portions and with a second kernel to the top and bottom portions. The method further comprises normalizing the filtered left, right, top, and bottom portions; utilizing a probabilistic Hough transform to detect a left edge, a right edge, a top edge, and a bottom edge in the left, right, top, and bottom portions respectively; and forming a border for the image by using the detected left, right, top, and bottom edges.

Additionally, a method for segmenting a pectoral muscle region from a full breast segmentation of a mammogram image is provided. The method includes applying a Gaussian blur to a mammogram image to smooth a pixel profile representing a breast skinline, applying a Sobel filter to the image, eroding the image to remove the pixel profile representing the breast skinline, and selecting the upper two-thirds of the image. The method also includes utilizing a probabilistic Hough transform to detect a plurality of pectoral muscle edges, and then forming and smoothing a pectoral muscle segmentation border utilizing the plurality of pectoral muscle edges thus forming an effectively curved segmentation border.

DETAILED DESCRIPTION OF THE DRAWINGS

Figure 1:
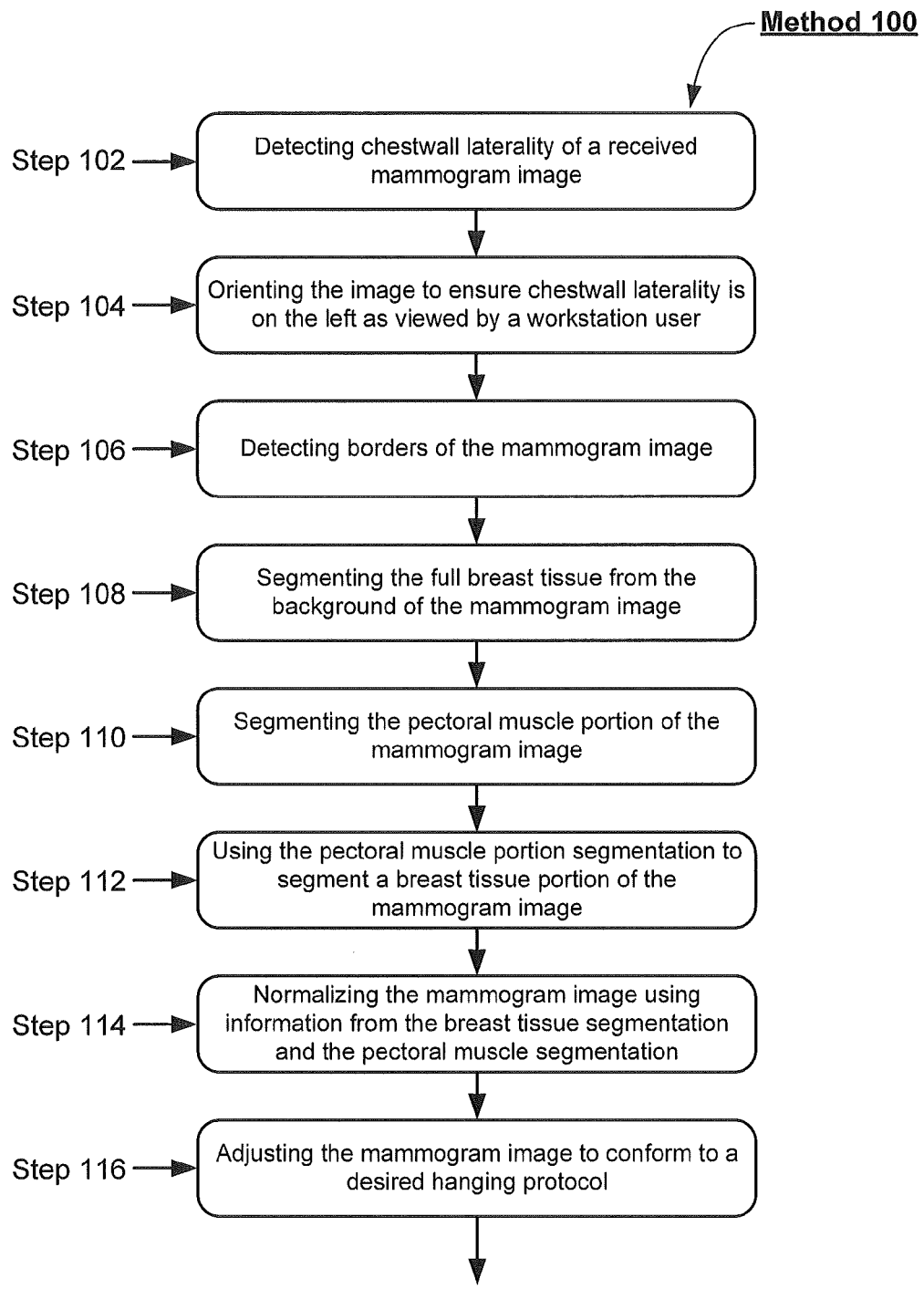
FIG. 1 depicts a flowchart for mammography preprocessing.

FIG. 1 presents an overview of the steps involved in a mammography preprocessing process. Mammography preprocessing begins with step 102 in which, after the mammogram image has been acquired, the chestwall side of the mammogram image is detected. The mammogram image is an electronic file containing a DICOM header. DICOM (Digital Imaging and Communication in Medicine) is an industry standard for viewing and distributing medical images. The DICOM header may contain the image dimensions and other useful information about the image. Detecting the chestwall side of the image may include determining the left or right laterality of the image. In step 104, the method orients the image so that the chestwall side of the image is on the left as it could be viewed by a user on the display of a workstation. This may be achieved by flipping the image about a central, vertical axis if the image is not already at the left. If the chestwall side of the image is already on the left side as viewed in a display, step 104 may effectively do nothing.

Next, the edges of the mammogram image, whether comprising a bright or dark border, are detected in step 106. The method continues by segmenting the full breast tissue (i.e. breast tissue and pectoral muscle) from the image background (step 108). Then, in steps 110 and 112 the pectoral muscle and the breast tissue are individually segmented. This may be accomplished by detecting the curved line of natural separation between the breast tissue and the pectoral muscle.

After the breast tissue and pectoral muscle have been segmented, information from the two segmented regions may be used to normalize the mammogram image to a consistent pseudo-modality in step 114. Finally, before the image is sent to a CAD server or a mammography workstation, certain operations are performed on the image to conform the presentation of the image to a desired hanging protocol (step 116), such as the standard chestwall-to-chestwall hanging protocol. Step 116 may involve clipping or removing the bright or dark borders or edges, image segmentation masking, and pairing and re-arranging of separate mammogram images into a single protocol image.

One of the techniques that is important to the embodiments of the invention is the Probabilistic Hough Transform (PHT). PHT was first introduced by N. Kiryati, Y. Eldar, and A. M. Bruckstein in 1990. In the standard implementation of the Duda and Hart algorithm of the Hough transform, the $(\rho, \theta)$ plane is divided in $N_\rho \times N_\theta$ rectangular cells and represented by an accumulator array. The algorithm is performed in two stages: the incrementation stage, often referred to as "voting", and the search stage. The execution of the Duda and Hart algorithm requires $O(M*N_\theta)$ operations in the incrementation stage and $O(N_\rho*N_\theta)$ in the search stage, where M is the number of edge points in an image. Thus the incrementation stage usually dominates the execution time of the algorithm. The difference between standard and probabilistic Hough transform is that only $m=\alpha M$, where $m<M$, edge points of the image are selected at random to guide the incrementation stage. As the number of operations at this stage is proportional to $m*N_\theta$, significant computation savings result as m can be made much smaller than M. To apply the PHT, pixels are randomly chosen from a uniform probability density function defined over the image. The PHT returns line segments rather than the whole lines. The connected line segments form a piece-wise linear curve shape for segmentation. Various embodiments of the invention apply the PHT concept to laterality detection, bright border edge detection, and pectoral muscle and breast tissue segmentation. In all those cases, the longer line feature in the image that manifests itself as a significant peak in the accumulator array of the conventional algorithm should be detectable, with high probability, using just m edge points to guide accumulation in the proposed algorithm. The various ways in which embodiments apply the PHT to improve mammography preprocessing will become clearer to one skilled in the art after completely reading this disclosure.

Figure 2:
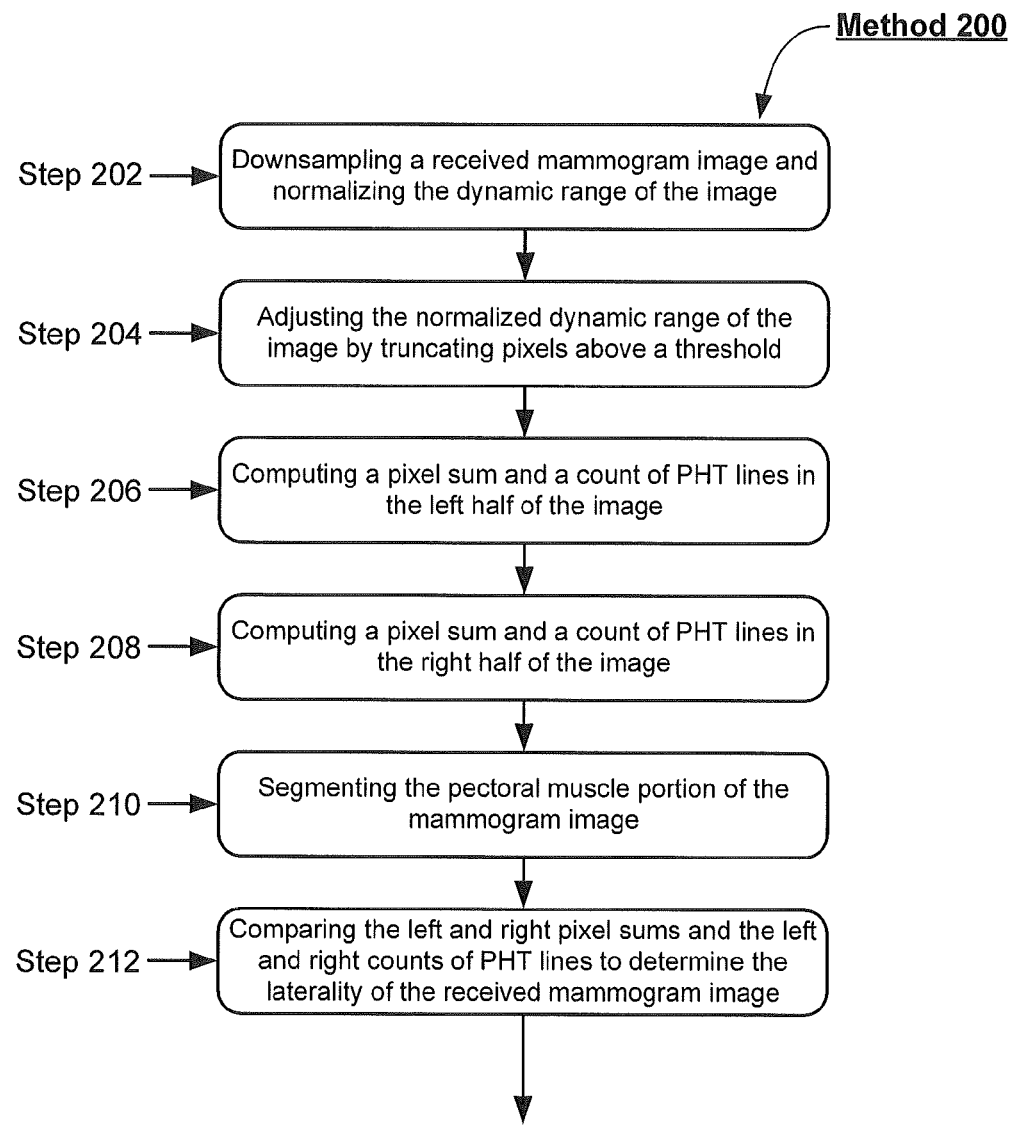
FIG. 2 depicts a flowchart for a laterality detection method.

FIG. 2 presents a method for detecting the laterality of a mammogram image. The basic idea of the detection of left/right laterality of the chestwall side is based on the assumption that the breast tissue intensity is mostly distributed at the chestwall side and the low intensity of the air background is mostly distributed at the opposite side. The method begins in step 202 when the mammogram image as supplied by the mammography equipment is downsampled to facilitate image processing. Also in step 202, the dynamic range of the image is normalized. An adjustment is made to the normalization of step 202 in step 204, in which the pixel values are truncated as necessary to limit the dynamic range to 90% of the maximum values.

Certain operative values are determined in steps 206 and 208. Values associated with the left half of the mammogram image are determined in step 206; values associated with the right half are determined in step 208. Thus, in step 206, a pixel sum is computed for the left half of the image, and a number of lines as determined by a probabilistic Hough transform of the image (PHT lines) in the left half of the image is computed if the left pixel sum is greater than zero. Likewise a pixel sum and number of PHT lines is computed for the right half of the image in step 208.

In step 210, the method requires the comparison of the values from steps 206 and 208. First, the left and right pixel sums are compared, then the left and right PHT line counts are compared. If the left pixel sum is greater than the right pixel sum, then the decision criterion determining whether the chestwall is at the left is whether the left PHT line count is less than the right PHT line count. But if the left pixel sum is not greater than the right pixel sum, then the decision criterion for determining whether the chestwall is at the right is whether the left PHT line count is greater than the right PHT line count. If the left and right pixel sums and left and right PHT line counts do not satisfy either of those criteria, then the chestwall will be considered as neither on the left nor the right side.

Figure 3:
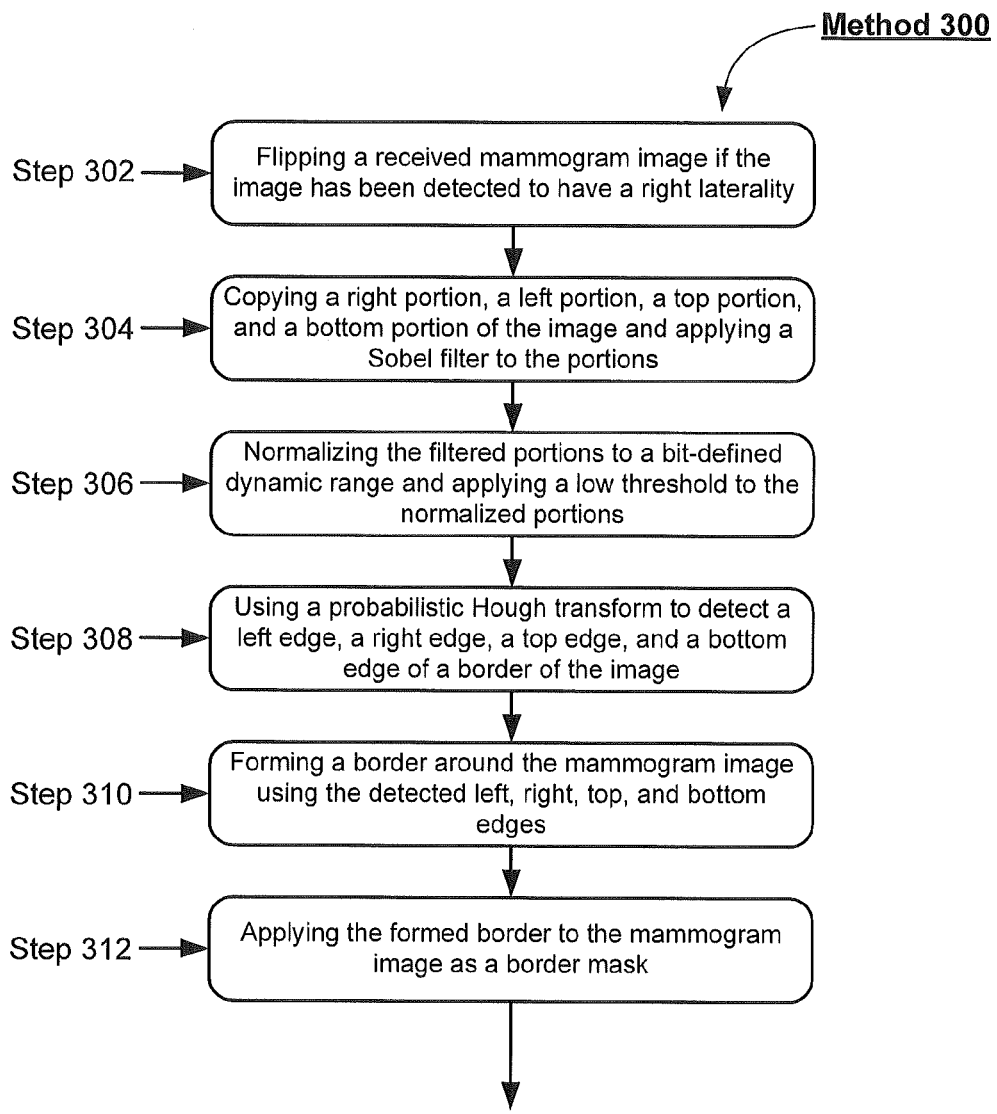
FIG. 3 depicts a flowchart for a bright or dark border edge detection method.

FIG. 3 shows a method for detecting the bright or dark borders of a mammogram image. The method may begin in step 302 by flipping the image along a vertical axis if the chestwall was detected as being on the right side by a method such as that of FIG. 2 above. The image will then be flipped so that the chestwall is on the left. After correcting the orientation of the image, the method, running on a computer capable of performing operations on a mammogram image, copies around 10% of the left, right, top, and bottom portions of the mammogram image (step 304). Also in step 304, the method applies a Sobel filter to the copied portions. A vertical 3×3 Sobel kernel is applied to the copies of the left and right portions, while a horizontal 3×3 Sobel kernel is applied to the top and bottom portions.

In step 306, the filtered left, right, top and bottom portions of the mammogram image are normalized to eight bits. The left and bottom portions are normalized by their respective maximum pixel values. The right and top portions are normalized according to their respective minimum pixel values. A threshold is applied to all pixels of the normalized left and right portions below 25% of their respective maximums, raising the pixels below up to the 25% threshold. A second threshold is applied to all pixels of the normalized top and bottom portions below 12.5%, raising those pixels up to the 12.5% threshold.

In step 308, the method directs the use of the PHT to detect the edges of the border. For the left edge, the first parameter of the PHT, the minimum line length, is 80% of the image height, the second parameter, the maximum line gap, is 25% of the image width, and the accumulator threshold is the image width. For the top edge, the first parameter of the PHT is 40% of the image width, the second parameter is 40% of the image height, and the accumulator threshold is the image height. The method continues in step 310 by forming a border from the detected left, right, top, and bottom edges, before terminating, in step 312, by applying the formed border to the image as a border mask to remove bright or dark gaps around the four sides of the mammogram image.

Figure 4:
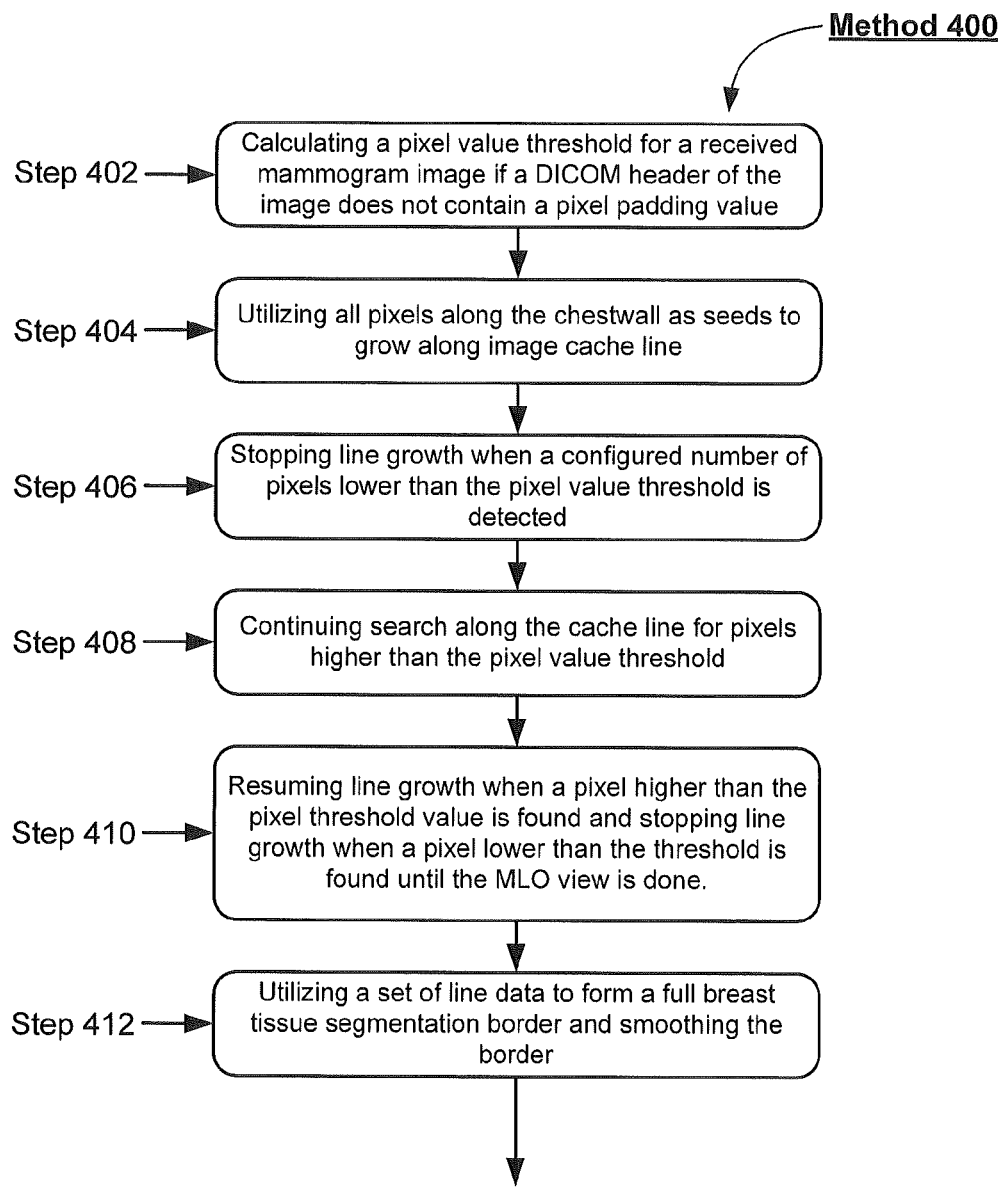
FIG. 4 depicts a flowchart for a full breast segmentation method.

FIG. 4 shows a flowchart for a method of segmenting the full breast tissue from the background of the mammogram image. Images used as inputs to the method should be downsampled and have suitable borders in place. If this has not been done beforehand, method 400 may include such steps. The method begins in step 402 by calculating a pixel value threshold for the image if the DICOM header of the image file does not contain a pixel padding value. In step 404, all the pixels along the chestwall side of the image are used as seed pixels from which to grow lines. By using all pixels along the chestwall as seeds to grow the lines along the image pixels horizontally in computer cache, fast segmentation speeds can be achieved. Using multiple seeds also allows the method to detect multiple non-connected regions such as in a mammography cleavage view, which includes the medial portions of both the right and left breasts in the image. Step 406 stops the growth of the lines when a configured number of pixels below the pixel value threshold are encountered. After the growth of a line is stopped, the method continues searching along the line in step 408 for pixels that are higher than the pixel value threshold. In step 410, the method resumes line growth when a pixel higher than the pixel threshold value is found and stops line growth when a pixel lower than the threshold. The step continues resuming and stopping line growth until the MLO view is done. The method of FIG. 4 terminates in step 412 when the breast segmentation border derived in the preceding steps is smoothed out.

Figure 5:
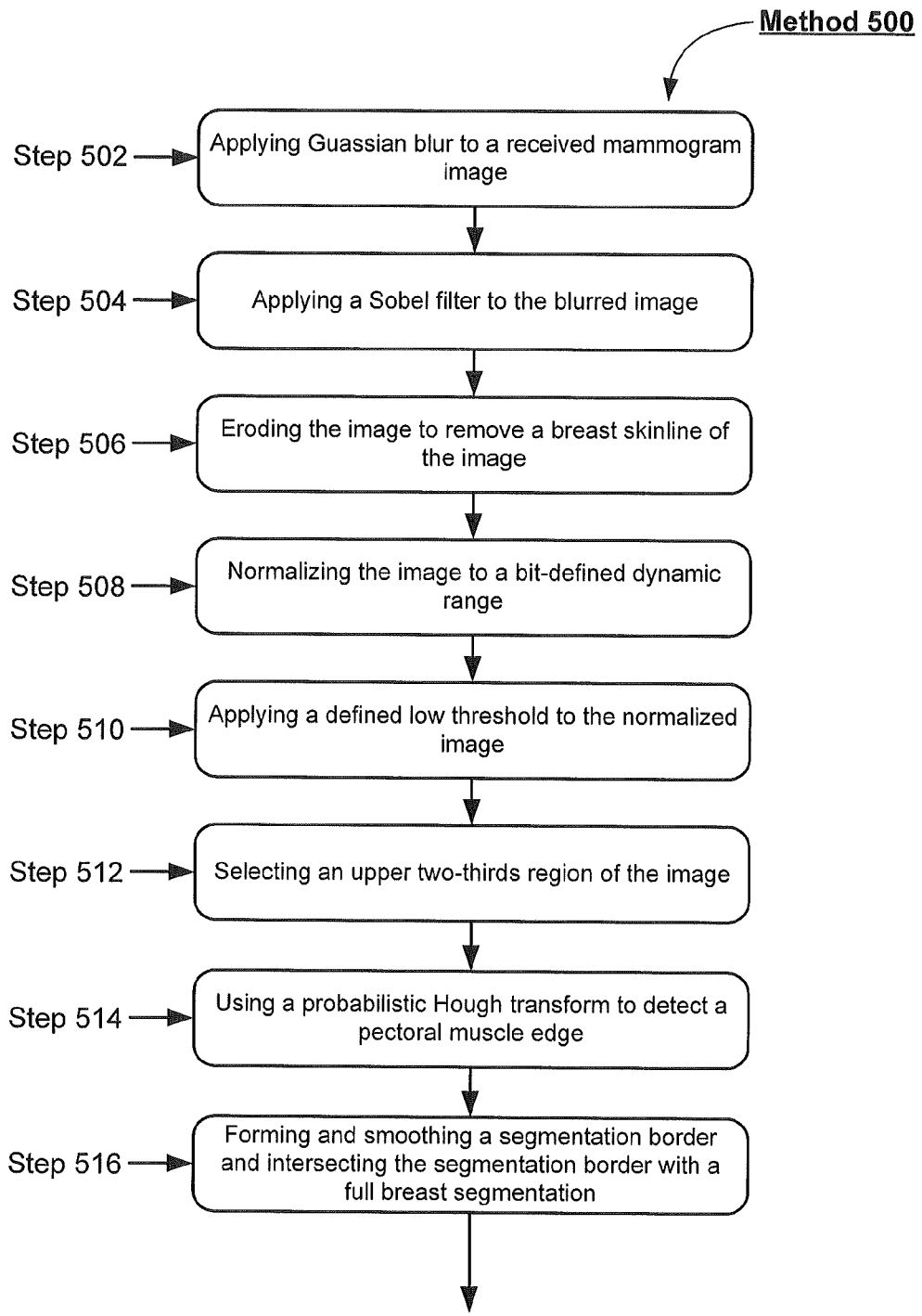
FIG. 5 depicts a flowchart for a pectoral muscle segmentation method.

FIG. 5 depicts a flowchart for a method of segmenting the pectoral muscle from the image. Like the method of FIG. 4, the method of FIG. 5 requires that images used as inputs to the method should be downsampled and have suitable borders in place. Again, if such processes have not been performed on the image, method 500 may include such steps. In step 502, a Gaussian blur is applied to the image to smooth the pixel profile along the breast skinline. A Sobel filter with a 3×3 vertical kernel is applied to the image in step 504. The filtered image is eroded to remove the breast skinline from the image (step 506). The image is normalized to eight bits by the maximum pixel value (step 508), and a threshold low of 6% is applied to the normalized image as disclosed above (step 510). In step 512 the upper two-thirds of the image are selected for use in step 514. In step 514, the method uses the probabilistic Hough transform to detect the edge of the pectoral muscle. The first parameter of the PHT, the minimum line length, is 10% of the image height. The second parameter of the PHT, the maximum line gap, is set to 25% of the image width. And the accumulator threshold is 120. After the edges of the pectoral muscle have been detected, the segmentation border is smoothed. The intersection of the pectoral muscle segmentation and the full breast segmentation defines the pectoral muscle and breast tissue distinctly in step 516.

Figure 6:
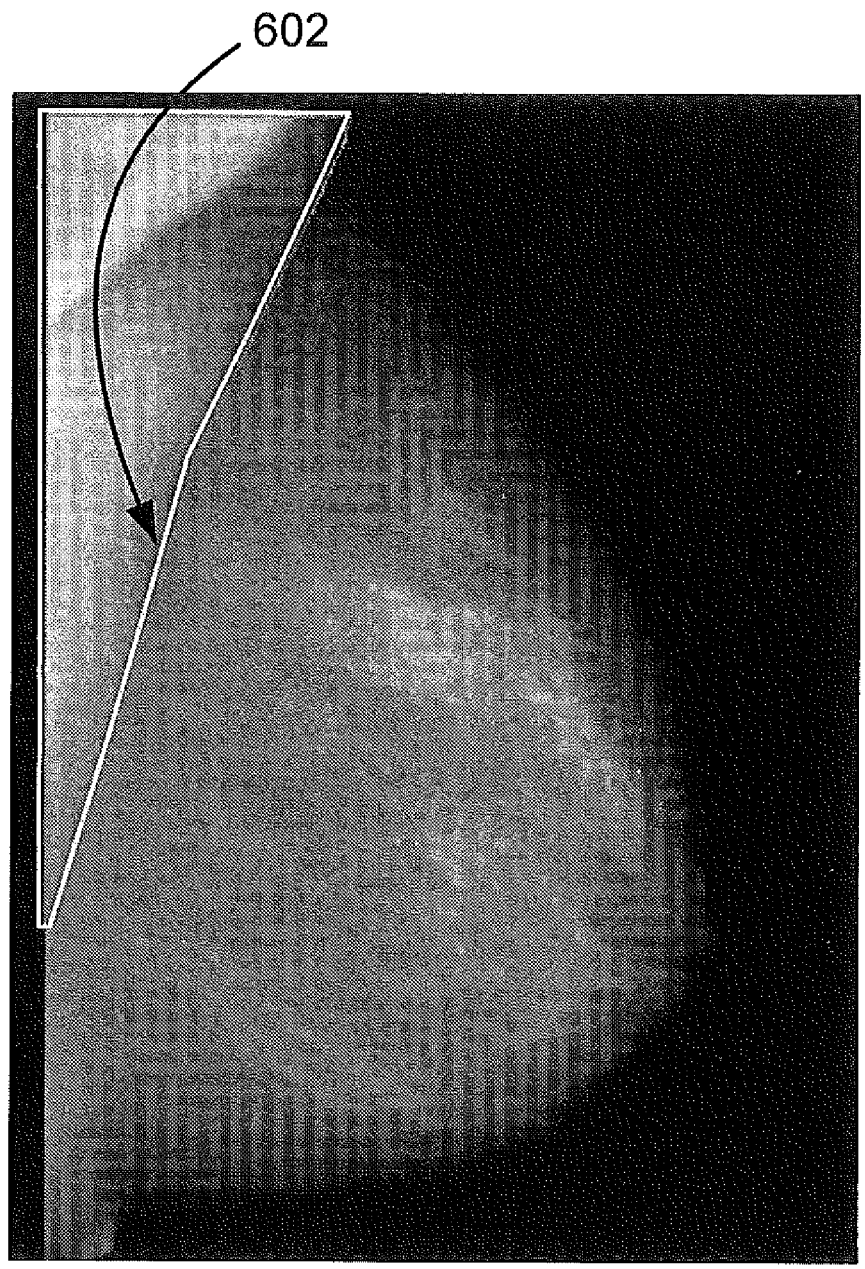
FIG. 6 depicts an exemplary result of a pectoral muscle segmentation method.

FIG. 6 depicts an exemplary pectoral muscle segmentation 602. The full breast tissue segmentation and pectoral muscle segmentation 602 may be intersected together in order to finalize the breast tissue segmentation.

The invention claimed is:

1. A method for detecting the laterality of a mammogram image, the method comprising:
    receiving a mammogram image;
    downsampling the mammogram image;
    performing a normalization process on the mammogram image;
    applying a probabilistic Hough transform (PHT) to a right half and a left half of the image to generate a number of right PHT lines in the right half of the image and to generate a number of left PHT lines in the left half of the image; and
    comparing the number of right PHT lines with the number of left PHT lines to determine a laterality of the mammogram image.

2. The method of claim 1, wherein performing the normalization process on the mammogram image comprises:
    performing a dynamic range normalization on the mammogram image; and
    truncating a set of bright pixels of the mammogram image using a maximum dynamic range value, the set of bright pixels being a set of pixels of the mammogram image with values greater than a predetermined threshold.

3. The method of claim 2, further comprising:
    summing a set of pixels of the mammogram image on the left half of the mammogram image to form a left sum and a set of pixels on the right half of the mammogram image to form a right sum; and
    comparing the left sum and the right sum to determine the laterality of the mammogram image.

4. The method of claim 3, further comprising providing the laterality of the mammogram image to a mammography image preprocessing system for use in preparing mammography images for viewing by a user of the system.

5. A method for detecting and determining the positions of borders in a mammogram image, the method comprising:
    receiving a mammogram image;
    duplicating a left portion, a right portion, a top portion, and a bottom portion of the mammogram image, each portion defined as a percentage of the mammogram image;
    applying a Sobel filter with a first kernel to the right and left portions and with a second kernel to the top and bottom portions;
    normalizing the filtered left, right, top, and bottom portions;
    utilizing a probabilistic Hough transform to detect a left edge, a right edge, a top edge, and a bottom edge in the left, right, top, and bottom portions respectively; and
    forming a border for the mammogram image by using the detected left, right, top, and bottom edges.

6. The method of claim 5, further comprising flipping the mammogram image about a central, vertical axis if the mammogram image has a right chestwall laterality so that the chestwall laterality becomes a left chestwall laterality.

7. The method of claim 5, wherein the left, right, top, and bottom portions are each defined as 10% of the mammogram image.

8. The method of claim 5, wherein the first kernel is a vertical 3×3 Sobel kernel and the second kernel is a horizontal 3×3 Sobel kernel.

9. A method for segmenting a pectoral muscle region from a full breast segmentation of a mammogram image, the method comprising:
    applying a Gaussian blur to the mammogram image to smooth a pixel profile representing a breast skinline;
    applying a Sobel filter to the image;
    eroding the image to remove the pixel profile representing the breast skinline;
    selecting the upper two-thirds of the image;
    utilizing a probabilistic Hough transform to detect a plurality of pectoral muscle edges; and
    forming and smoothing a pectoral muscle segmentation border utilizing the plurality of pectoral muscle edges.

10. The method of claim 9, wherein applying the Sobel filter comprises applying a Sobel filter with a vertical 3×3 Sobel kernel.

11. The method of claim 9, further comprising intersecting the pectoral muscle segmentation border with a full breast tissue segmentation to form a breast tissue segmentation and a pectoral muscle region segmentation.

12. The method of claim 11, wherein the full breast tissue segmentation is created by growing lines from a set of all pixels that are located on the chestwall side of the image.

* * * * *